United States Patent [19]

Cunard

[11] Patent Number: 5,338,127
[45] Date of Patent: Aug. 16, 1994

[54] PLAY GYM BEARING COVER

[75] Inventor: Joel C. Cunard, Bedford, Pa.

[73] Assignee: Hedstrom Corporation, Bedford, Pa.

[21] Appl. No.: 13,060

[22] Filed: Feb. 3, 1993

[51] Int. Cl.⁵ ............................................. B65D 65/02
[52] U.S. Cl. .......................................... 403/79; 59/93; 150/154
[58] Field of Search ............... 472/118, 120, 121, 122, 472/123, 125; 59/93, 78.1; 150/154; 403/79

[56] References Cited

U.S. PATENT DOCUMENTS

| | | | |
|---|---|---|---|
| 116,870 | 7/1871 | Richards | 59/93 X |
| 2,954,958 | 10/1960 | Sander et al. | 472/118 X |
| 3,014,683 | 12/1961 | Littmann | 472/118 X |
| 4,799,522 | 1/1989 | Ilon | 59/93 X |
| 4,954,939 | 9/1990 | Hutchins | 59/93 X |

FOREIGN PATENT DOCUMENTS 478149 7/1975 U.S.S.R. ..................... 59/93

*Primary Examiner*—Randolph A. Reese
*Assistant Examiner*—Christopher J. Novosad
*Attorney, Agent, or Firm*—Cesari and McKenna

[57] ABSTRACT

A bearing fitting for attaching a swing device to the crossbar of a play gym includes an axle for mounting to the crossbar, a hook including a shank, a closed loop at one end of the shank encircling the axle and an open loop at the opposite end of the shank for engaging through an eye of the swinging device. A deformable resilient cover is engaged on the hook. The cover has a pair of closely spaced apart side walls, a top wall connecting the side walls, a hole in the top wall and a large bottom opening into the space between the walls. The cover is dimensioned for engagement on the hook so that the cover snugly surrounds the open loop of the hook with the hook shank extending out through the hole in the top wall.

6 Claims, 2 Drawing Sheets

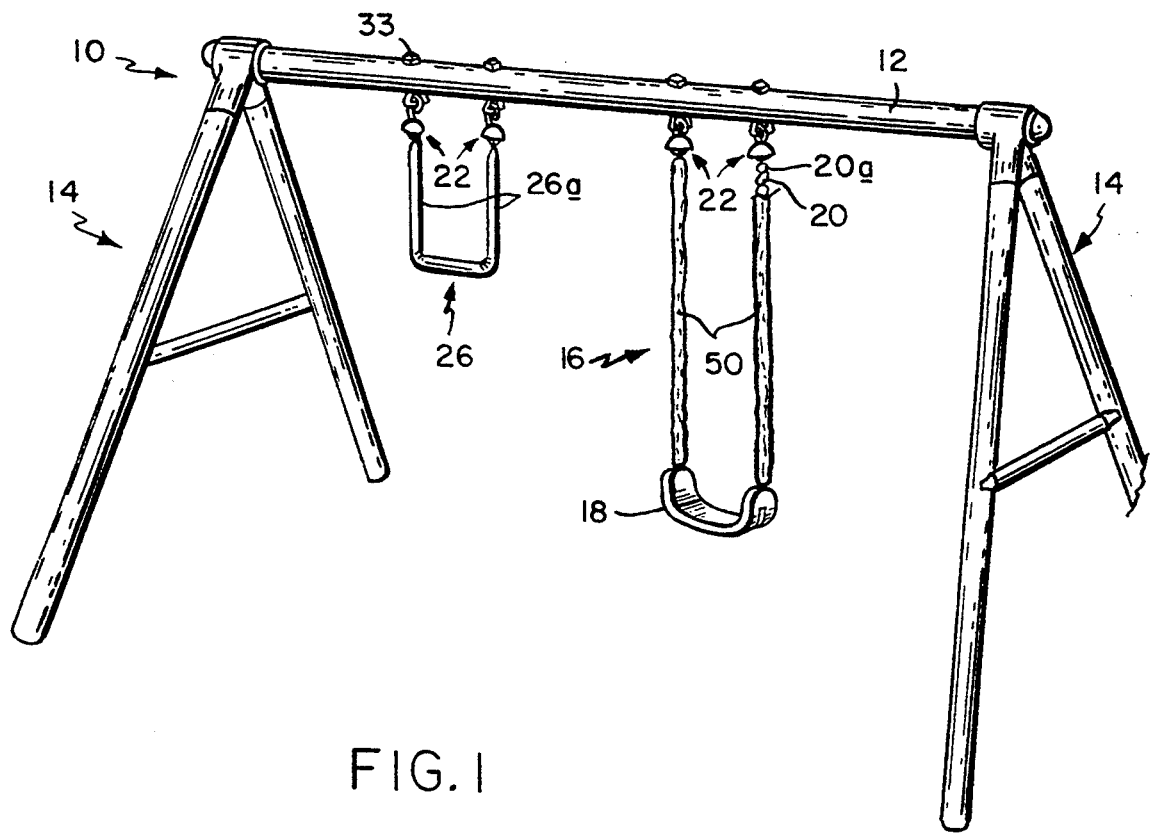
FIG. 1
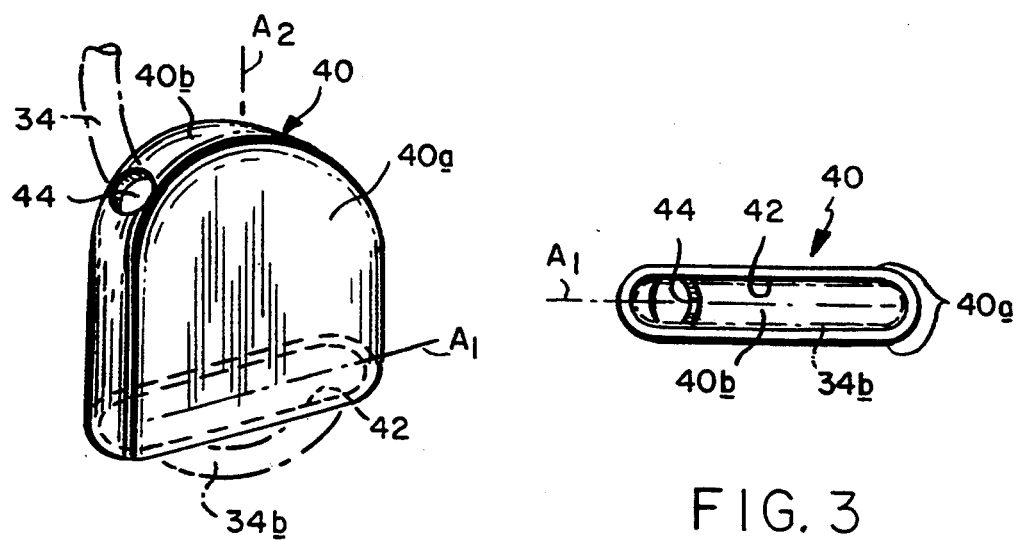
FIG. 2
FIG. 3

PLAY GYM BEARING COVER

This invention relates to a children's play gym or swing set. It relates more particularly to an improved bearing structure for the swinging components of the play gym or swing set.

BACKGROUND OF THE INVENTION

Most modern play gyms and swing sets comprise a horizontal crossbar supported above the ground by legs connected to the opposite ends of the crossbar. Various active components of the play gym are suspended from the crossbar. Some of these active components such as swings, trapezes and the like are designed to swing to and fro relative to the crossbar which remains stationary. Therefore, they are suspended from the crossbar by way of bearing structures which permit such movement with a minimum amount of friction and wear.

The typical bearing structure includes an eye bolt which is anchored to the crossbar so that the eye of the eye bolt extends down from the crossbar and a double-ended hook with upper and lower loops. The upper loop of the hook is hooked through the eye bolt and the lower loop of the hook is hooked to the particular ride being supported. For example, if the ride is a swing seat supported by a pair of chains, the lower loops of a pair of such hooks are hooked through the uppermost links of those chains.

When a play gym or swing set is sold, some of the parts are pre-assembled and other parts are left for the customer to assemble. Thus, in the case of the bearing structures, the upper loop of the hook is invariably pre-assembled to the eye of the eye bolt and an annular nylon bearing member is usually included between that loop and the eye bolt to minimize friction. The eye bolt, in turn, may or may not be pre-bolted to the play gym crossbar. However, it is usually left to the purchaser to connect the various rides to the lower loops of the hooks of the bearing structures and for this reason those loops are left open to facilitate such installation. After purchasing a play gym, the customer can suspend a particular ride from the play gym crossbar by hooking an appropriate part or parts of the ride onto the lower hook loop of one or more bearing structures hanging from the crossbar. Then, each loop should be closed by clinching the loop to prevent the ride from becoming detached from that hook.

In many cases, however, the customer fails to follow the assembly instructions usually provided in the present day play gyms and swing sets. One such lapse which is particularly prevalent is the failure to properly clinch or close the lower loops of the bearing structure hooks which connect the various rides to the play gym crossbar. As a result, when the particular ride is being used, the resulting motion can sometimes cause the ride to disconnect from the bearing structure, possibly resulting in injury to the child using the ride.

Another problem with the usual bearing structures on play gyms and swing sets is the fact that pinch points are created at the connections of the various rides to the bearing fittings. Normally, these are accessible to the children using the rides so that sometimes the children may injure their fingers at these pinch points.

SUMMARY OF THE INVENTION

Accordingly it is an object of the present invention to provide an improved bearing fitting for a play gym or swing set.

Another object of the invention is to provide a fitting of this type which minimizes the likelihood of a swing, trapeze or other active component of the play gym or swing set from becoming disconnected from the stationary support structure.

A further object of the invention is to provide such a bearing fitting which minimizes the number of accessible pinch points at the connections of the various rides to the play gym support structure.

Still another object is to provide such a bearing fitting which is decorative.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the above objects are satisfied by providing special molded plastic covers on the hooks of the various bearing fittings that connect the swings, trapezes and other active components of the play gym to the play gym crossbar. These covers are tough, but flexible and resilient, so that they can be engaged on the bearing fitting hooks so that they overlap and cover the lower loops of those hooks thereby to close the openings into the hooks. Therefore, those lower loops do not have to be closed after the various rides are connected to the hooks; due to the presence of the covers, those rides cannot become disconnected from the hooks. Furthermore, the covers overlap the connections between the various rides and the bearing fitting hooks so as to prevent children's fingers from contacting pinch points at those locations.

Finally, as will become apparent, the covers on the bearing fittings add a decorative feature to the play gyms and swing sets incorporating the bearing fittings of this invention.

BRIEF DESCRIPTION OF THE DRAWINGS

For a fuller understanding of the nature and objects of the invention, reference should be had to the following detailed description, taken in connection with the accompanying drawings, in which:

FIG. 1 is an isometric view of a children's gym set incorporating bearing fittings made in accordance with this invention;

FIG. 2 is an isometric view on a much larger scale showing in detail the bearing covers on the bearing fittings of the FIG. 1 gym set;

FIG. 3 is a bottom plan view of the bearing covers, and

DETAILED DESCRIPTION OF ILLUSTRATIVE EMBODIMENT

Figure 4A:
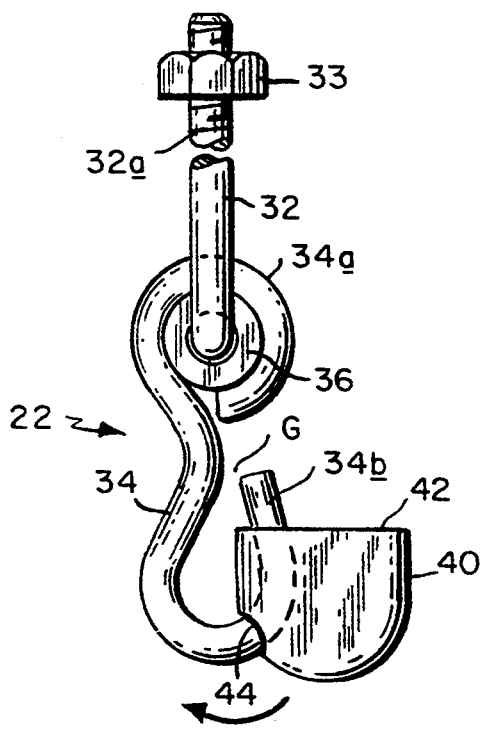
FIGS. 4A to 4D illustrate the mounting of the bearing covers onto the bearing fittings of the FIG. 1 gym set.

FIG. 1 of the drawings shows a children's play gym 10 which includes a tubular metal crossbar 12 supported above the ground by a pair of A-frames 14 connected to the opposite ends of the crossbar. Suspended from the crossbar 12 is a swing 16 which includes a strap-like seat 18 supported by chains 20 whose upper ends are connected to crossbar 12 by means of bearing fittings shown generally at 22 made in accordance with this invention.

The play gym also includes a generally U-shaped trapeze shown generally at 26 having parallel legs 26a whose upper ends are also connected to crossbar 12 by similar bearing fittings 22.

Referring now to FIG. 4A, each bearing fitting 22 may include an eye bolt 32 having a threaded shank 32a inserted through a vertical opening (not shown) in crossbar 12 and anchored there by a nut 33 at the top of crossbar. The fitting also includes a double-ended hook 34 having an upper loop 34a which passes through the eye of the eye bolt 32 so that the bolt forms an axle for loop 34a and is clinched so that the loop 34a is closed. Preferably, an annular nylon bearing member 36 is engaged around the eye bolt within the loop 34a to minimize friction and wear when the hook 34 moves relative to the eye bolt 32.

Hook 34 also includes a larger lower loop 34b which is only partially closed so that an appreciable gap G exists between the free end of loop 34b and the body or shank of the hook 34.

Figure 4B:
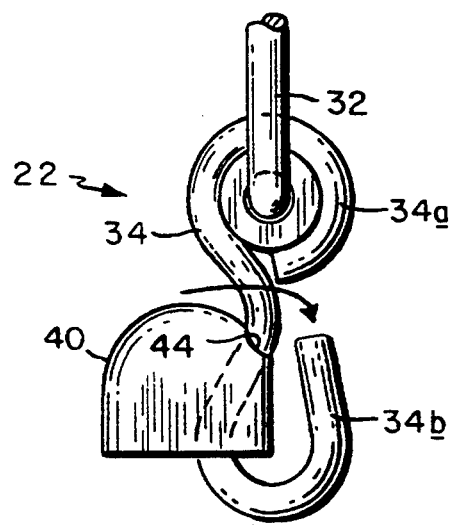
Figure 4C:
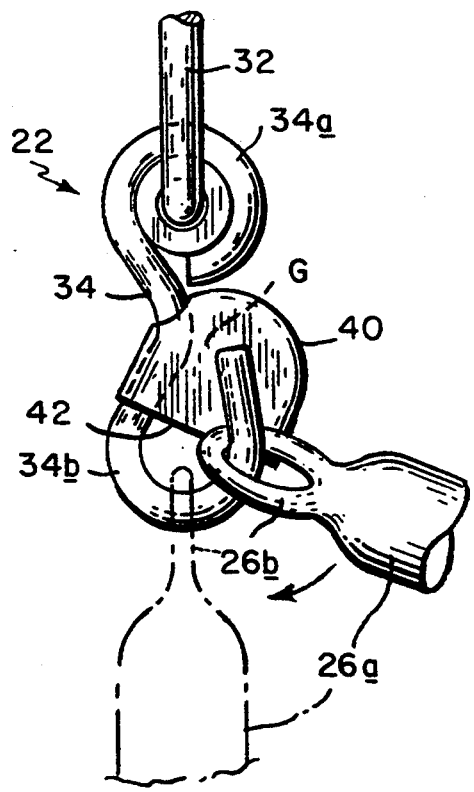
Figure 4D:
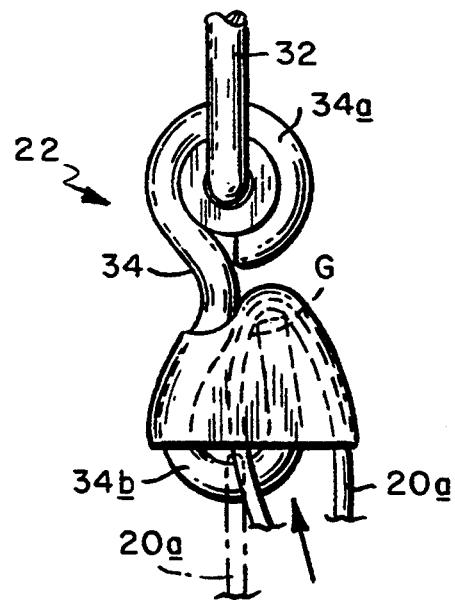

In the case of the swing 16, the uppermost links 20a of the chains 20 are engaged on the lower loops 34b of the hooks 34 of the two bearing fittings 22 as shown in phantom in FIG. 4D. In the case of the trapeze 26, eyes 26b are provided at the upper ends of the trapeze legs 26a and these eyes are engaged on the lower loops 34b of the bearing fitting hooks 34 of the bearing fittings 22 that support the trapeze, as shown in phantom in FIG. 4C.

The final component of each bearing fitting 22 is a tough, flexible, resilient, molded plastic cover 40 which is engaged over the lower loop 34b of each bearing fitting hook 34.

As shown in FIGS. 2 and 3, each cover 40 is a relatively narrow, e.g., 0.25 in., shell-like part having opposite more or less semi-elliptical walls 40a connected by a top or bridging wall 40b. There is a large opening 42 into the space between the walls all along the minor axis A, of the ellipse at the underside of the cover and a relatively small, e.g., 0.25 in., hole 44 is provided in the bridging wall 40b offset from the major axis A, of the ellipse near the top of the cover. The cover is made of a very strong and tear-resistant plastic material such as PVC plastisol with a wall thickness of about 0.06 in., which can be stretched and distorted without cracking or splitting.

To install a cover 40 on a hook 34, the cover 40 is inverted and the free end of the hook loop 34b is inserted through the hole 44 in the cover wall 40b as shown in FIG. 4A. The cover is then slid along that loop in the direction of the arrow shown in FIG. 4A to the position shown in FIG. 4B, wherein the cover is right side up and positioned more or less in the middle of the hook 34. Then, the cover is swung around in the direction of the arrow shown in FIG. 4B to the position shown in FIG. 4C wherein a cover wall 40a engages against the free end of the hook loop 34b, as seen in that figure.

At this point, if the particular bearing fitting 22 is being used to support the trapeze 26, before the cover 40 is moved to its final position on hook 34, the eye 26b at the end of a trapeze leg 26a is engaged on the hook loop 34b as shown in FIG. 4C. Then, with the trapeze leg in the vertical position shown in phantom in that figure, the cover 40 is manipulated until the free end of the hook loop 34b is received in the cover mouth 42 so that the cover substantially completely encloses the lower end of the hook 34 as shown in phantom in FIGS. 2 and 3.

On the other hand, if the fitting 22 is being used to support swing 16, the cover 40 may be manipulated immediately to the position shown in FIGS. 2 and 4D wherein the cover substantially covers the lower loop 34b of the hook 34. Then, the uppermost link 20a of the chain 20 can be pushed up through the cover opening 42 and maneuvered through gap G so that it engages on the loop 34b, the cover 40 being distorted and stretched as needed to enable the loop 34b to hook through the eye of the link 20a as shown in phantom in FIG. 4D. Being of resilient material, the cover will always return to its undistorted shape shown in FIGS. 2 and 3.

It is a feature of the invention that when cover 40 is properly engaged on the hook 34, the cover completely closes the gap G of the hook loop 34b. Furthermore, the cover 40 is resilient and is stretched only with difficulty so that there is little chance of the chain 20 or the trapeze arm 26a becoming disconnected from the hook 34 even if the hook loop 34b is not completely closed or clinched. In fact, cover 40 obviates the need for the customer to clinch the loop 34b.

Cover 40 also overlaps and encloses the connection between the chain 20 or trapeze leg 26a to the hook loop 34b so that it shields children's fingers from pinch points at those locations. Shielding is especially effective when the chains 20 are covered by plastic sheaths 50 as shown in FIG. 1 because the upper end of each sheath 50 can reach almost to the underside of the corresponding cover 40 as shown in FIG. 1 so that only a small crack is present between the underside of the cover and the top of the sheath. With this arrangement, there is very little likelihood of a child's fingers being pinched at the connections of the various rides to the play gym support structure.

It will also be apparent that in covering the lower end of each hook 34, the cover 40 gives the connection a very finished look and a degree of ornamentation particularly if the cover is colored to match the play gym frame structure and/or components of the swing 16 and/or trapeze 26.

In sum, the providing of the bearing fittings 22 with their covers 40 on play gyms and swing sets should increase the marketability of the gyms and swing sets. Yet, the covers do not add appreciably to the overall cost of those products.

It will thus be seen that the objects set forth above, among those made apparent from preceding description are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. A bearing fitting for pivotally attaching a swing device to the crossbar of a children's play gym or swing set, said fitting comprising means defining an axle for mounting to the crossbar;
hook means including a shank, a closed loop at one end of the shank encircling said axle and an open loop defining a hook at the opposite end of the shank for engaging through an eye on the device, and a flexible, resilient, deformable cover, said cover having a pair of closely spaced-apart side walls, a top wall connecting said side walls, a hole in the top wall and a relatively large bottom opening into the space between said walls, said cover being dimensioned for engagement on the hook means so that the cover snugly surrounds the open loop of the hook means with the hook means shank extending out through said hole in the cover top wall.

2. The bearing fitting defined in claim 1 and further including an annular bearing member between said axle and said closed loop of the hook means.

3. The bearing fitting defined in claim 1 wherein said cover side walls are shaped so that the cover is generally semi-elliptical in side elevation and has a major axis and a minor axis, said hole being offset from the major axis of the semi-ellipse and the bottom opening being located at the minor axis of the semi-ellipse.

4. The bearing fitting defined in claim 1 wherein said cover is of PVC plastisol.

5. For a bearing fitting including hook means having a shank and an open loop, a flexible, resilient, deformable cover, said cover of PVC plastisol having a pair of closely spaced-apart side walls, a top wall connecting said side walls, a hole in the top wall and a relatively large bottom opening into the space between said walls, said cover being dimensioned for engagement on the hook means so that the cover can surround the open loop of the hook means with the hook means shank extending out through said hole in the cover top wall.

6. The cover defined in claim 5 wherein said cover side walls are shaped so that the cover is generally semi-elliptical in side elevation and has a major axis and a minor axis, said hole being offset from the major axis of the semi-ellipse and the bottom opening being located at the minor axis of the semi-ellipse.

* * * * *